(12) United States Patent
Najjar et al.

(10) Patent No.: US 8,468,162 B2
(45) Date of Patent: Jun. 18, 2013

(54) STRING MATCHING IN HARDWARE USING THE FM-INDEX

(75) Inventors: Walid A. Najjar, Yorba Linda, CA (US); Edward Bryann C. Fernandez, Moreno Valley, CA (US); Stefano Lonardi, Claremont, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 13/415,784

(22) Filed: Mar. 8, 2012

(65) Prior Publication Data

US 2012/0233185 A1 Sep. 13, 2012

Related U.S. Application Data

(60) Provisional application No. 61/450,503, filed on Mar. 8, 2011.

(51) Int. Cl.
*G06F 17/30* (2006.01)

(52) U.S. Cl.
USPC .......................... 707/752; 707/753; 382/238

(58) Field of Classification Search
USPC .................................. 707/752, 753; 382/238
See application file for complete search history.

(56) References Cited

U.S. PATENT DOCUMENTS

2012/0330567 A1* 12/2012 Bauer et al. ..................... 702/20

* cited by examiner

*Primary Examiner* — Belix M Oritz Ditren
(74) *Attorney, Agent, or Firm* — Klein, O'Neill & Singh, LLP

(57) ABSTRACT

String matching is a ubiquitous problem that arises in a wide range of applications in computer science, e.g., packet routing, intrusion detection, web querying, and genome analysis. Due to its importance, dozens of algorithms and several data structures have been developed over the years. A recent breakthrough in this field is the FM-index, a data structure that synergistically combines the Burrows-Wheeler transform and the suffix array. In software, the FM-index allows searching (exact and approximate) in times comparable to the fastest known indices for large texts (suffix trees and suffix arrays), but has the additional advantage to be much more space-efficient than those indices. This disclosure discusses an FPGA-based hardware implementation of the FM-index for exact and approximate pattern matching.

17 Claims, 10 Drawing Sheets

STRING MATCHING IN HARDWARE USING THE FM-INDEX

CROSS REFERENCE TO RELATED APPLICATIONS

This application claims the benefit of the filing date of U.S. Provisional Patent Application No. 61/450,503, filed Mar. 8, 2011, entitled STRING MATCHING IN HARDWARE USING THE FM-INDEX, the disclosure of which is incorporated by reference herein.

BACKGROUND OF THE INVENTION

The present invention relates generally to string matching, and more particularly to electronic circuitry for string matching using the FM-Index.

String matching is the problem of searching for patterns in a longer string. It is a ubiquitous problem with a wide variety of applications: in network routing, prefixes of incoming packets are matched to a routing table to determine the next destination; in intrusion detection, signatures of known network attacks are matched to incoming packets to prevent infection from entering the system; in web querying, set of keywords entered by users have to be matched against millions of webpages; in personal genomics, short patterns obtained from sequencing instruments have to be matched to the reference human genome.

Due to the importance of the matching problem, dozens of algorithms and several data structures have been developed since the seventies. Some of the algorithms are based on finite automata, for instance, the Aho-Corasick algorithm or the Knuth-Morris-Pratt algorithm. Other methods preprocess the text and build indices (e.g., hash tables or search trees) to allow faster searching. A recent breakthrough in this field is the FM-index, which is a compressed index that combines the properties of the suffix array with the Burrows-Wheeler transform. Software tools using this index are two orders of magnitude faster than tools relying on conventional indices like hash tables and variations thereof.

The Burrows-Wheeler transform (BWT) was initially introduced for data compression. This invertible transform itself does not compress the text; instead it rearranges the order of the symbols to a form that is much easier to compress with classical encoders. The popular compression software bzip2 found on Linux/MacOS systems is based on the BWT. Years after the seminal paper was published, evidence of the equivalence between the BWT and the suffix array opened the road to the development of the FM-index.

The FM-index is an index that contains the BWT of the text to be searched in the form of a set of numerical arrays. The index allows searching for a pattern using binary search (in logarithmic time) instead of a linear time scan. Not only does the FM-index enable string matching (exact and approximate) in times comparable to the best known indices for large texts (suffix trees and suffix arrays), but the FM-index has the additional advantage of being extremely space-efficient. Generally, the FM-index has been primarily used only in the bioinformatics domain. Software tools such as Bowtie, BWA, and SOAP2 have shown to be one to two orders of magnitude faster than older tools using classical indices like hash tables.

BRIEF SUMMARY OF THE INVENTION

Aspects of invention provide circuitry for processing substrings with respect to a text string. In one aspect the invention provides a method using circuitry for processing a substring with respect to a text string, comprising: storing in memory information for characters in a sorted BWT of a text string indicating a position of a first occurrence of each of those characters in the sorted Burrows-Wheeler transform (BWT) of the text string; storing in memory, for characters of an allowable alphabet, an ordered set of values indicating the number of occurrences of that character in preceding characters of a BWT of the text string, with the order of the values in the order of the characters of the BWT of the text string; initializing a signal indicating a first index to indicate a first position of the ordered set of values and initializing a signal indicating a second index to indicate a second position of the ordered set of values, the second position being different than the first position; iteratively receiving a signal indicative of a new character of a specified substring, setting, by the circuitry, the signal indicating the first index to indicate a first new position, the first new position being based on a sum of a) the value of the ordered set of values currently indicated by the position of the first index for the new character and b) the information indicating the first occurrence of the new character in the sorted BWT of the text string, and setting, by the circuitry, the signal indicating the second index to indicate a second new position, the second new position being based on a sum of c) the value of the ordered set of values currently indicated by the position of the second index for the new character and d) the information indicating the first occurrence of the new character in the sorted BWT of the text string; and providing, by the circuitry, a signal indicating that the specified substring does not appear in the text string if, for any characters of the specified substring, the position of the first index relative to the position of the second index within the ordered set of values is reversed compared to the initial position of the first index relative to the initial position of the second index within the ordered sets of value or if the position of the first index and the position of the second index within the ordered sets of values is the same position.

In another aspect the invention provides circuitry for processing a substring with respect to a text string, comprising: a shift register configured to receive a information of a substring and sequentially provide as an output information of characters of the substring; a memory block configured to store information of an I-table for a text string; a plurality of memory blocks configured to store information of a C-table for an allowable alphabet for the text string; a top multiplexer configured to select, using the output of the shift register, as an output one of first memory locations from each of the plurality of memory blocks storing information of the C-table; a bottom multiplexer configured to select, using the output of the shift register, as an output one of second memory locations from each of the plurality of memory blocks storing information of the C-table; a top summer configured to sum the output of the top multiplexer and a selected, using the output of the shift register, a memory location of the memory block storing information of the I-table, an output of the top summer indicating the first memory locations of the plurality of memory blocks storing information of the C-table; and a bottom summer configured to sum the output of the bottom multiplexer and the selected memory location of the memory block storing information of the I-table, an output of the bottom summer indicating the second memory locations of the plurality of memory blocks storing information of the C-table.

In another aspect the invention provides circuitry for processing a substring with respect to a text string, comprising: memory for storing information for characters in a sorted BWT of a text string indicating a position of a first occurrence of each of those characters in the sorted Burrows-Wheeler transform (BWT) of the text string; memory for storing characters of an allowable alphabet, an ordered set of values indicating the number of occurrences of that character in preceding characters of a BWT of the text string, with the order of the values in the order of the characters of the BWT of the text string; means for initializing a first index to indicate a first position of the ordered set of values and means for initializing a second index to indicate a second position of the ordered set of values, the second position being different than the first position; means for iteratively receiving a signal indicative of a new character of a specified substring; means for setting the first index to indicate a first new position, the first new position being based on a sum of the value of the ordered set of values currently indicated by the position of the first index for the new character and the information indicating the first occurrence of the new character in the sorted BWT of the text string; and means for setting the second index to indicate a second new position, the second new position being based on a sum of the value of the ordered set of values currently indicated by the position of the second index for the new character and the information indicating the first occurrence of the new character in the sorted BWT of the text string.

These and other aspects of the invention are more fully comprehended on review of this disclosure.

DETAILED DESCRIPTION

Figure 1:
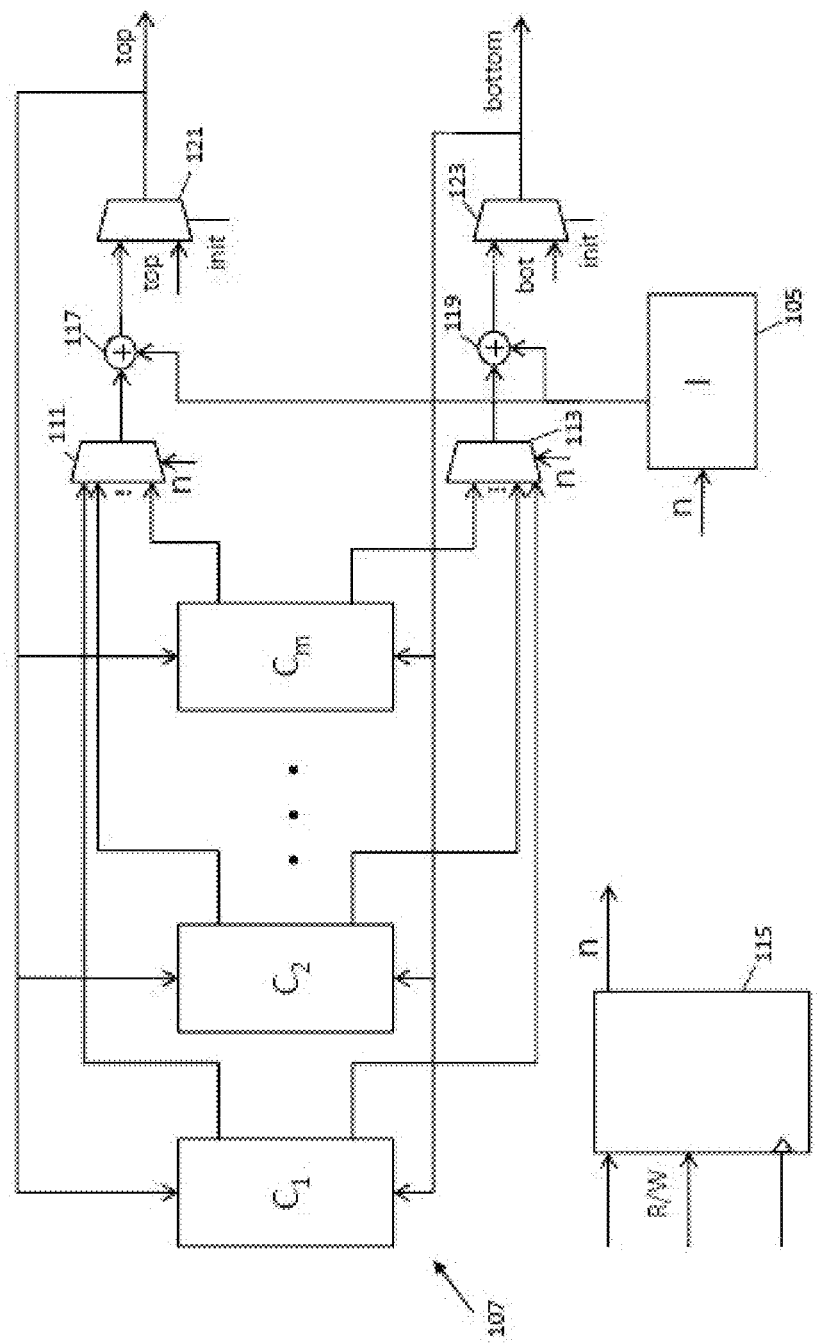
FIG. 1 is a block diagram of a hardware implementation for searching for a string using an FM-index in accordance with aspects of the invention.

FIG. 1 is a block diagram of an example embodiment of a hardware implementation configured to perform searches using an FM-index data structure. The hardware implementation is preferably provided using an FPGA. The hardware implementation determines if a specified substring appears in a text string.

The implementation includes two memory banks forming an I-table 105 and a C-table 107. The I-table stores information indicating the first occurrence of a character in a sorted BWT of the text string. The C-table stores, for each character of an allowable alphabet, a sub-table in which each element is a value indicating the number of occurrences of the character in the preceding characters of the BWT of the text string.

In general, the hardware implementation determines values for top and bottom pointers into the C-table, with the values iteratively determined for up to all of the characters of the specified substring. The values for the top and bottom pointers are initially set to a first index and a last index, respectively, of the C-table, and are thereafter determined as follows:

$$Topnew = C\text{-}table[n, Topcurrent] + I\text{-}table[n]$$

$$Bottomnew = C\text{-}table[n, Bottomcurrent] + I\text{-}table[n]$$

where n indicates a current character of the specified substring, with n beginning at a last character of the specified substring and sequencing through the specified substring to a first character of the specified substring.

The specified substring does not appear in the text string if, for any of the characters of the specified substring, the value of Bottomnew is less than or equal to Topnew. If, however, all of the character of the specified substring are processed without this occurring, then the specified substring appears in the text string.

Returning to FIG. 1, the allowable alphabet includes m characters, and as illustrated in FIG. 1, the C-table includes m sub-tables, $C_1$-$C_m$, one for each allowable character. Signals indicative of values for each of the C-table sub-tables pointed to by top index are provided to a first multiplexer 111, and signals indicative of values for each of the C-table sub-tables pointed to by bottom index are provided to a second multiplexer 113. The first multiplexer may therefore be considered a C-table top multiplexer, and the second multiplexer may be considered a C-table bottom multiplexer. Each of the first multiplexer and the second multiplexer receive, as a selector, a signal indicative of the current character of the specified substring. The first multiplexer is therefore configured to provide a signal indicative of a value of the sub-table for the current character of the specified substring pointed to by the top index. Similarly, the second multiplexer is therefore configured to provide a signal indicative of a value of the sub-table for the current character of the specified substring pointed to by the bottom index.

The specified substring may be, as illustrated in FIG. 1, stored in a shift register 115, to with the shift register providing signals indicative of values of characters of the specified substring, beginning with a last character and proceeding through the substring to a first character of the substring.

The signal indicative of the current character of the substring is also provided to the I-table, with the current character serving as an index into the I-table. A signal indicative of a value in the I-table indexed by the current character is received by a first summer and a second summer 119. Also received by the first summer is an output of the first multiplexer, and also received by the second summer is an output of the second multiplexer.

The output of the first summer provides a new value for the top index, and the output of the second summer provides a new value for the bottom index. However, in the embodiment of FIG. 1, a third multiplexer 121 and a fourth multiplexer 123 are used to account for initial conditions. More particularly, in the embodiment of FIG. 1, the third multiplexer receives the output of the first summer and a signal indicative of an initial value for the top index, with an init signal provided to select the initial value for a first cycle of a particular search and the output of the first summer otherwise. Similarly, the fourth multiplexer receives the output of the second summer and a signal indicative of an initial value for the bottom index, with the init signal provided to select the initial value for the first cycle of the particular search and the output of the second summer otherwise.

In some embodiments, the implementation of FIG. 1 additionally includes logic circuitry to determine if the bottom index is less than or equal to the top index, indicating that the specified substring does not occur in the text string, or if each character of the specified substring has been processed without this occurring, indicating that the specified substring does occur in the text string. In some embodiments the logic circuitry may implement he search related portions of the finite state machine of FIG. 4.

Figure 2:
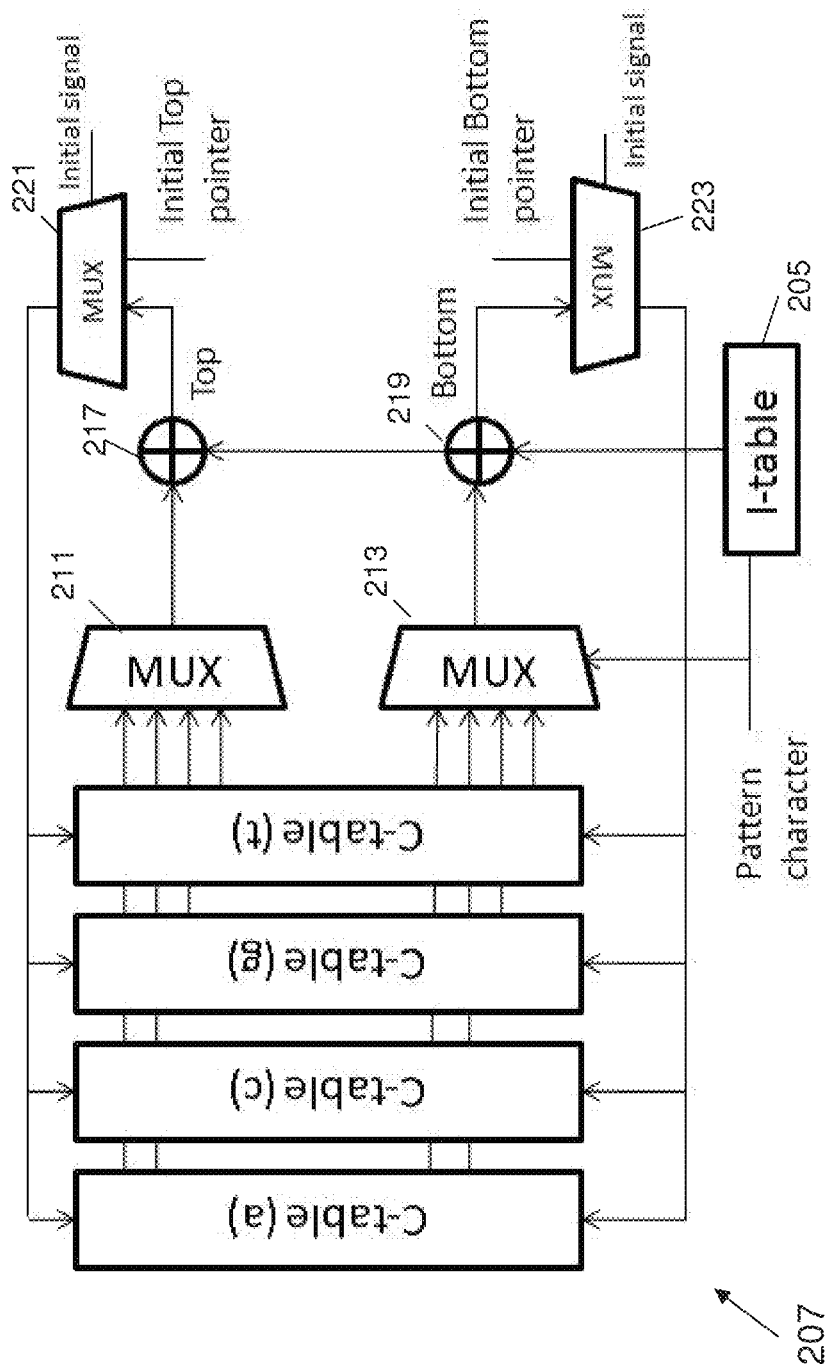
FIG. 2 is a block diagram of a further hardware implementation for searching for a string using an FM-index in accordance with aspects of the invention.

FIG. 2 is a block diagram of a further FPGA-based hardware implementation of the FM-index. The hardware implementation determines if a specified substring appears in a text string. The hardware implementation is configured to do so utilizing an FM-index. The BWT of a text is obtained in software and loaded in memory on the FPGA, with more particularly a C-table 207 and an I-table 205 associated with the BWT being loaded in memory.

The implementation includes two memory banks foaming the I-table and the C-table. The FPGA preferably uses BRAMs as storage units. The I-table stores information indicating the first occurrence of a character in a sorted BWT. The C-table stores, for each character of the allowable alphabet, a sub-table in which each element is a value indicating the number of occurrences of the character in the preceding characters of the BWT. In the example of FIG. 2, for simplicity the allowable alphabet is A, C, G, and T, and the C-table is shown with separate memory elements for the table for each character in the allowable alphabet.

A search pattern is placed on a shift register (not shown), with characters of the search pattern provided in reverse sequence as an input n to the I-table, as in the implementation shown in FIG. 1. The input n is used as a selector to the I-table. The input n is also used to select the corresponding character sub-table of the C-table. As illustrated in the example implementation of FIG. 2, values from each sub-table are provided to a pair of multiplexers 211, 213, with the input n provided as a selector for each multiplexer. The values provided to the multiplexers are selected using top and bottom pointers. The top and bottom pointers address the C-table sub-tables. The outputs of the memory bank of the C-table are four values referring to the columns of A, C, G, and T. These values are inputs to the multiplexors and the current character symbol, n, is used as the selector. The same symbol n also addresses the I-table.

The output of the I-table and the multiplexors of the C-table are provided to summers 217, 219, where they are added to compute the new values of the top and bottom pointers. The new pointers are then used as addresses in the next iteration. An additional pair of multiplexors 221, 223 is used for initializing the top and bottom pointers as addresses of the C-table.

The number of bits to implement the C-table is the product of the text size (in number of characters), the size of the alphabet and the logarithm of the text size. The text size corresponds to the number of rows of the C-table, the size of the alphabet corresponds to the number of columns, and the logarithm of the text section length corresponds to the number of bits per element of each column entry of the C-table. The number of bits required to implement the I-table is product of the logarithm of the text size and the size of the alphabet.

Operation for the circuitry of FIG. 2, and FIG. 1 as well, may be more fully comprehended considering the following example.

Given a text string Q, BWT(Q), the BWT of string the text may be generated in five steps:
1. Terminate the text Q with a unique character: "$".
2. Generate all rotations of the text.
3. Lexicographically sort all the rotations.
4. Extract the last character of all the entries of the sorted list.
5. Join the last characters in the same order they appeared in the sorted list. The newly generated text is the BWT (Q).

Table 1 illustrates an example of deriving a BWT(Q). For convenience the example, like the example hardware of FIG. 1, uses an example derived from DNA string matching because of the small alphabet size: A, G, C, and T. Notice that characters to the left of the "$", in Table 1, form a suffix. A suffix array indicates the position of each possible suffix in the original string. Table 2 shows the suffix array representation of the text Q in Table 1. For example at index 5 the suffix value is "c$" and its position in the original string is 13. The suffix at index 8 is "gctaattaggtacc$" and its position is 0 since it is the whole string.

TABLE 1

Example of deriving the Burrows-Wheeler Transform of a text. The text is terminated by a "S" symbol.

| Rotations: | Sorted Rotations: |
|---|---|
| Original String: | |
| GCTAATTAGGTACC$ | |
| gctaattaggtacc$ | $gctaattaggtac-C |
| ctaattaggtacc$g | aattaggtacc$gc-T |
| taattaggtacc$gc | acc$gctaattagg-T |
| aattaggtacc$gct | aggtacc$gctaat-T |
| attaggtacc$gcta | attaggtacc$gct-A |
| ttaggtacc$gctaa | c$gctaattaggta-C |
| taggtacc$gctaat | cc$gctaattaggt-A |
| aggtacc$gctaatt | ctaattaggtacc$-G |
| ggtacc$gctaatta | Gctaattaggtacc-$ |
| gtacc$gctaattag | ggtacc$gctaatt-A |
| tacc$gctaattagg | gtacc$gctaatta-G |
| acc$gctaattaggt | taattaggtacc$g-C |
| cc$gctaattaggta | tacc$gctaattag-G |
| c$gctaattaggtac | taggtacc$gctaa-T |
| $gctaattaggtacc | ttaggtacc$gcta-A |

Burrows-Wheeler Transform:
CTTTACAG$AGCGTA

TABLE 2

Example of deriving the suffix array of a text. The rightmost column is the suffix array of the text

| Index | Sorted Suffixes: | Suffix Array |
|---|---|---|
| Original String: | | |
| GCTAATTAGGTACC$ | | |
| 0 | $ | 14 |
| 1 | aattaggtacc$ | 3 |

TABLE 2-continued

Example of deriving the suffix array of a text. The rightmost column is the suffix array of the text

| Index | Sorted Suffixes: | Suffix Array |
|---|---|---|
| 2 | acc$ | 11 |
| 3 | aggtacc$ | 7 |
| 4 | attaggtacc$ | 4 |
| 5 | c$ | 13 |
| 6 | cc$ | 12 |
| 7 | ctaattaggtacc$ | 1 |
| 8 | gctaanaggtacc$ | 0 |
| 9 | ggtacc$ | 8 |
| 10 | gtacc$ | 9 |
| 11 | taattaggtacc$ | 2 |
| 12 | tacc$ | 10 |
| 13 | taggtacc$ | 6 |
| 14 | ttaggtacc$ | 5 |

The equivalence of the BWT and the suffix array representation has been established. After generating the suffix array (Table 2) the BWT(Q) is sorted and used to generate the I and C tables. The sorted BWT(Q) is denoted as SBWT(Q).

Table-I—For every element x of the alphabet of Q. Table-I[x]=index of its first occurrence in SBWT(Q). For example, in FIG. 1, A, C, G, and T appear at index 1, 5, 8. and 11 in SBWT(Q).

Table-C—For each index n in BWT(Q) and for each character x in the alphabet Table-C[n,x]=number of occurrences of x in BWT(Q) in the range [0, n−1]. As an example, consider index n=10 in the C-Table in Table 3, column A has a value of 3 because there are three occurrences of A in the range n=0 to n=9.

TABLE 3

I-table stores the first occurrence of each character on the sorted BWT(Q). The C-table stores the count of each character on a previous location. The leftmost column of the C-table is the indices of the suffix array.

| $ | A | A | A | A | C | C | C | G | G | G | T | T | T | T |
|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 |

I-table

| A | C | G | T |
|---|---|---|---|
| 1 | 5 | 8 | 11 |

C-table

| Index | BWT(Q) | A | C | G | T |
|---|---|---|---|---|---|
| 0 | C | 0 | 0 | 0 | 0 |
| 1 | T | 0 | 1 | 0 | 0 |

TABLE 3-continued

I-table stores the first occurrence of each character on the sorted BWT(Q). The C-table stores the count of each character on a previous location. The leftmost column of the C-table is the indices of the suffix array.

| 2 | T | 0 | 1 | 0 | 1 |
|---|---|---|---|---|---|
| 3 | T | 0 | 1 | 0 | 2 |
| 4 | A | 0 | 1 | 0 | 3 |
| 5 | C | 1 | 1 | 0 | 3 |
| 6 | A | 1 | 2 | 0 | 3 |
| 7 | G | 2 | 2 | 0 | 3 |
| 8 | $ | 2 | 2 | 1 | 3 |
| 9 | A | 2 | 2 | 1 | 3 |
| 10 | G | 3 | 2 | 1 | 3 |
| 11 | C | 3 | 2 | 2 | 3 |
| 12 | G | 3 | 3 | 2 | 3 |
| 13 | T | 3 | 3 | 3 | 3 |
| 14 | A | 3 | 3 | 3 | 4 |
| 15 | Total | 4 | 3 | 3 | 4 |

The FM-index is a pattern searching technique that operates on the BWT. The FM-index includes two pointers: top and bottom. The top and bottom pointers are discussed in the context of suffix arrays because of the inherent equivalence of BWT and suffix arrays. The indices between the top and bottom pointers are all the suffix locations where a pattern occurs on the text. Top points to an index of the suffix array element where a specific pattern is first located. The bottom pointer limits where the pattern can be last found. If bottom points to an index that is less than or equal to an index pointed by top, then the pattern does not occur on the text.

Pattern searching using the FM-index starts with initializing the top and bottom pointers to the first and last indices of the C-table respectively. To search for a pattern, one character is processed at a time, beginning with the last character of the pattern. The top and bottom pointers move to different suffix array indices according to the current character processed and the current index where the top and bottom pointers are indexing. To compute for the new location of the pointers, Equation 1 is followed for the top and bottom pointer respectively.

Updating of Top and Bottom pointers using the *I*-table and *C*-table.     Equation 1

$$Topnew = C\text{-table}[n, Topcurrent] + I\text{-table}[n]$$
$$Bottomnew = C\text{-table}[n, Bottomcurrent] + I\text{-table}[n]$$

Text: GCTAATTAGGTAC
Pattern: TAGG $1^{st}$ iteration: n = G $$Top_{new} = C_G(Top_{current}) + I(G)$$
$$= 0 + 8 = 8$$
$$Bot_{new} = C_G(Bot_{current}) + I(G)$$
$$= 3 + 8 = 11$$

$2^{nd}$ iteration: n = G $$Top_{new} = C_G(Top_{current}) + I(G)$$
$$= 1 + 8 = 9$$
$$Bot_{new} = C_G(Bot_{current}) + I(G)$$
$$= 2 + 8 = 10$$

-continued $3^{rd}$ iteration: $n = A$ $$Top_{new} = C_A(Top_{current}) + I(A)$$
$$= 2 + 1 = 3$$
$$Bot_{new} = C_A(Bot_{current}) + I(A)$$
$$= 3 + 1 = 4$$

$4^{th}$ iteration: $n = T$ $$Top_{new} = C_T(Top_{current}) + I(T)$$
$$= 2 + 11 = 13$$
$$Bot_{new} = C_T(Bot_{current}) + I(T)$$
$$= 3 + 11 = 14$$

EXAMPLE 1

Example of Searching the Pattern "TAGG" on the String "GCTAATTAGGTACC" using the FM-Index. After the 4th Iteration the Pattern is Found Because the Index of the Top Pointer is Less than the Bottom Pointer Example 1 shows an example of searching the pattern "TAGG" on the example string in Table 1. The top and bottom pointers are initialized to 0 and 15 respectively. The example begins with the last character, G, of the pattern. Equation 1 is applied four times, corresponding to four characters of the pattern. After the fourth iteration, the top and bottom pointers are at index 13 and 14 respectively. Since the index of the top pointer is less than the index of the bottom pointer, the pattern TAGG occurs in the string.

As another example, a search for the pattern "CCGA" in the example string shown in Table 1 may be performed as follows. Beginning from the last character, the top and bottom pointers move until the second iteration where the pointers index the same suffix array element. This pattern search is shown in Example 2. In this example, the FM-index does not have to look at all the characters of the pattern when it identifies that the pattern does not appear on the text from its preliminary search.

Text: GCTAATTAGGTACC

Pattern: CCGA $1^{st}$ iteration: $n = A$ $$Top_{new} = C_G(Top_{current}) + I(G)$$
$$= 0 + 1 = 1$$
$$Bot_{new} = C_G(Bot_{current}) + I(G)$$
$$= 4 + 1 = 5$$

$2^{nd}$ iteration: $n = G$ $$Top_{new} = C_A(Top_{current}) + I(A)$$
$$= 0 + 8 = 8$$
$$Bot_{new} = C_A(Bot_{current}) + I(A)$$
$$= 0 + 8 = 8$$

EXAMPLE 2

Example of Searching the Pattern "CCGA" on the String "GCTAATTAGGTACC" using the FM-Index. After the 2nd Iteration the Pattern is Not Found Because the Top and Bottom Pointers Index the Same Suffix Array Location Three methods may be used to identify the location of the search pattern once its existence has been determined:
1. Use characters from BWT(Q) of the text instead of the pattern to trace back the end of the text using Equation 1. The number of steps Equation 1 is applied is the location where the pattern occurs on the text. Possibly the main advantage of this method is that no additional storage is required. However, its drawback is the potentially large number of steps that could lengthen the search time.
2. Store the suffix array elements that indicate the positions where the suffixes are located. Upon locating the existence the pattern, the suffix array element that corresponds to that suffix array index is the location of the pattern. The main advantage of this approach is the immediate availability of pattern locations. However, its disadvantage is the storage area of all suffix array elements could be huge for very large texts.
3. Store only samples of the suffix array and trace back until a sampled suffix array element is reached. Add the number of steps Equation 1 is used during the trace back and the location indicated by the sampled suffix array element, and the sum is the location of the pattern in the text.

The last approach combines the advantages of the first two methods and limits their disadvantages. The last method was implemented in hardware to locate patterns in a text.

Figure 3:
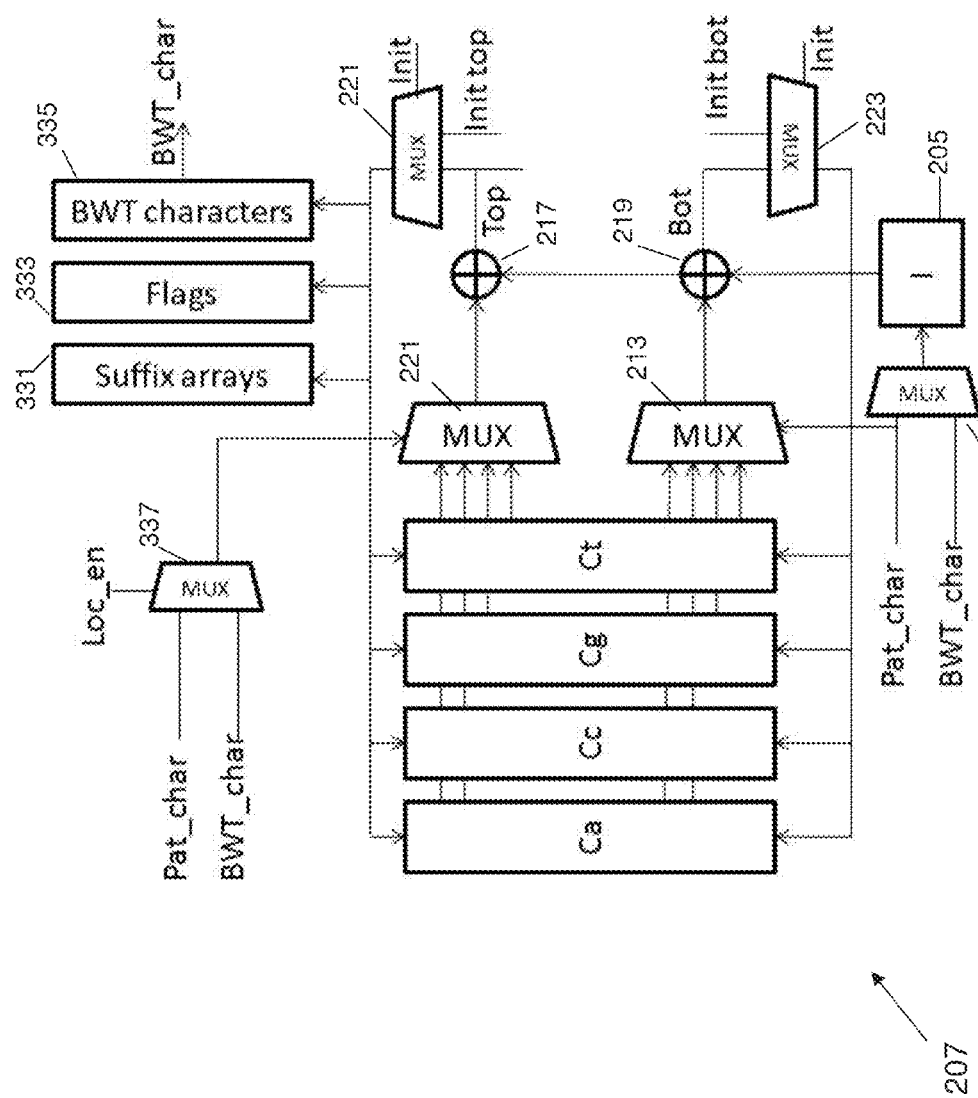
FIG. 3 is a block diagram of a hardware implementation for searching for and locating a string using an FM-index in accordance with aspects of the invention.

The implementation of FIGS. 1 and 2 may be modified to support locating a pattern, e.g. a string, that appears in the text, as shown in FIG. 3, which, for simplicity of discussion, is a modified version of the embodiment of FIG. 2, with common portions indicated by common reference numerals. In the embodiment of FIG. 3, additional storage is used for sampled suffix array elements 331, flag bits 333 and the BWT characters 335 of the text section length. The sampled suffix array elements stores samples of the suffix array for the text. Storing increased numbers of samples may decrease time to determine location of a substring in the text, but also results in increased memory requirements for storing the samples. The flags bits indicate if a character is sampled. The BWT(Q) characters (BWT_char in FIG. 3) are used to address the I-table and to select the data from the C-table when the occurrence of the pattern in the text is established. Lastly, a finite state machine is used to facilitate the transfer of data from the different storage structures, with an example state diagram for the finite state machine shown in FIG. 4.

The top pointer addresses the additional memory of the sampled suffix array elements, flags, and BWT(Q) characters. Additional multiplexors 337, 339 are used to select whether a search pattern character or a BWT(Q) character is used for the C and I tables. The selector for these multiplexors is the Loc_en control signal from the finite state machine.

Figure 4:
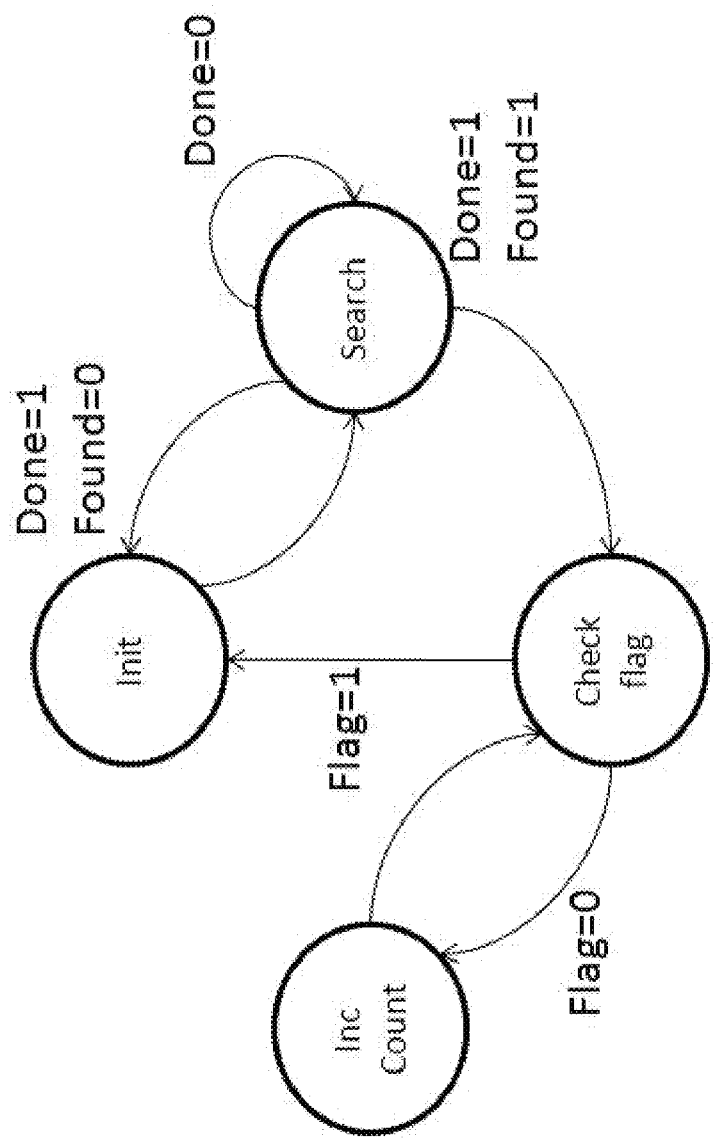
FIG. 4 is a state diagram for a finite state machine.

FIG. 4 shows a diagram of the finite state machine controller. It has four states: The Init state initializes the top and bottom pointers. This state asserts the init signal used as multiplexor select for initialization. The Search phase is where the top and bottom pointers move in finding the pattern on the text. A counter is set on the Search phase to execute a number of times equal to the length of the pattern. If the bottom pointer addresses a location that is equal to or less than the top pointer at any time instant, then the pattern does not occur on the text and the state machine goes back to the Init phase. If the bottom pointer addresses a location that is greater than the top pointer at the end of the count, then the next state is the Check Flag indicating that the pattern appears on the text. This state asserts the loc_en signal so that the C and I tables use the BWT(Q) characters as the multiplexor instead of pattern characters. The Check flag state checks if a character position is a sampled suffix array element. If the position is sampled, then it returns to the Init phase otherwise it moves to the Increment state. The Increment state adds one to a counter that indicates the number of steps the trace back occurred. After the Increment state, it returns again to the Check Flag state.

|   | BWT | Suffix array sample |
|---|-----|---------------------|
| 0 | C   | 14                  |
| 1 | T   |                     |
| 2 | T   |                     |
| 3 | T   |                     |
| 4 | A   | 4                   |
| 5 | A   |                     |
| 6 | C   |                     |
| 7 | G   |                     |
| 8 | $   | 0                   |
| 9 | A   |                     |
| 10 | G  |                     |
| 11 | C  |                     |
| 12 | G  | 10                  |
| T → 13 | T |                   |
| B → 14 | A |                   |

Is Top = 13 sampled? NO           Is Top = 14 sampled? NO

Count = 1                          Count = 2

$1^{st}$ iteration: n = T          $2^{nd}$ iteration: n = A $Top_{new} = C_T(Top_{current}) + I(T)$     $Top_{new} = C_A(Top_{current}) + I(A)$
$= 11 + 3 = 14$                              $= 3 + 1 = 4$ Is Top = 4 sampled? YES Location = Suffix_Array(T) + Count
= 4 + 2 = 6

EXAMPLE 3

Example of Locating the Pattern "TAGG" on the String "GCTAATTAGGTACC" using the Third Approach. After the $2^{nd}$ Iteration the Pattern is Located at Position 6 of the Text Example 3 shows sampled suffix array elements and how the pattern "TAGG" is located on a sample string by operation of the hardware of FIG. 3 in conjunction with the finite state machine of FIG. 4. After identifying that the pattern appears in the text, for example as discussed with respect to Example 1, whether the top points to a sampled suffix array element is checked. If not, Equation 1 is utilized for the top pointer using the BWT character as the symbol for the C and I tables. A counter is also incremented, with the counter tracking the number of steps performed. Equation 1 is continuously used and the counter incremental until the top pointer indexes a sampled suffix array element. Example 3 shows that the pattern "TAGG" is located after the end of the second iteration where the top pointer indexes a sampled suffix array element.

Experiments were performed to determine whether there are any advantages to splitting one large text, with a single set of C and I tables, into multiple text sections with one set of C and I tables for each section. The experiments use a text of 262,144 characters corresponding to 16 modules of 16K characters each, or 32 modules of 8K characters, or 64 modules of 4K characters etc. The suffix array is sampled every 32 elements and the search pattern length is 36 characters. A text section corresponds to one hardware module. The length of the text in one module ranges from 1K to 16K characters.

Figure 10:
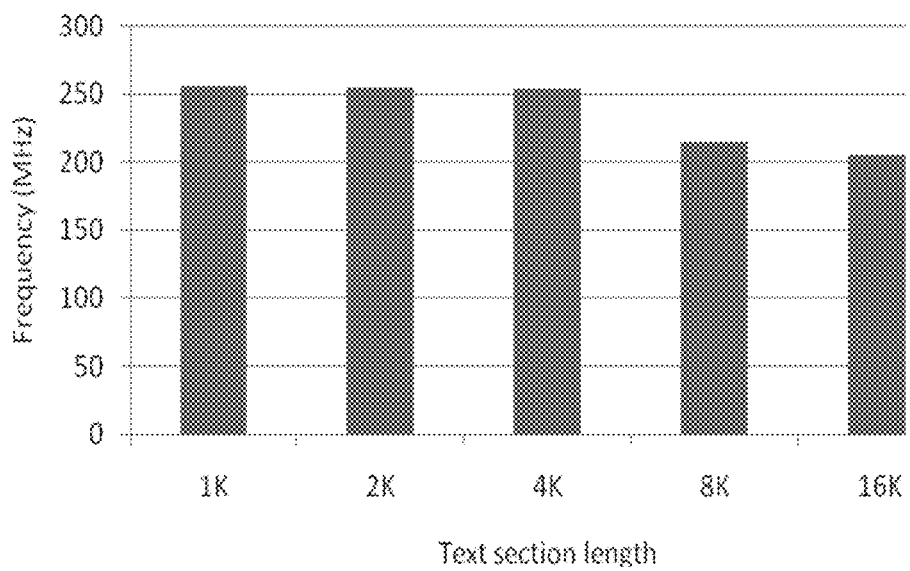
FIG. 10 shows graphs of operating frequency and area versus text section lengths for various implementations.
Figure 10:
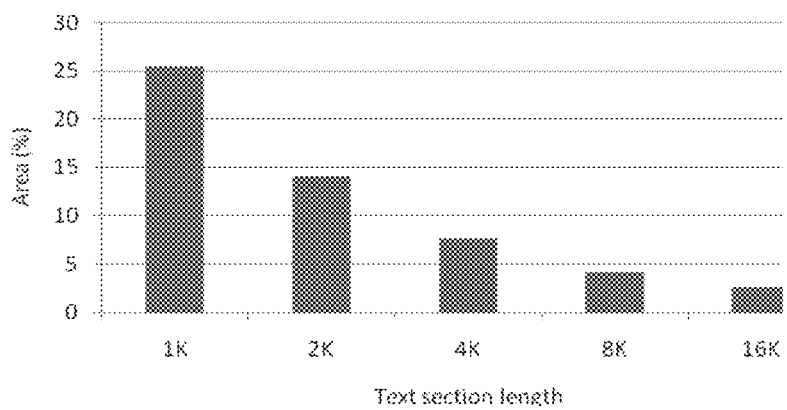

The implementations were synthesized with place and route on a Xilinx Virtex 6 (XC6VLX760) FPGA. FIG. 10 shows the operating frequency and slices utilized (as % of total slices) for increasing text section length per module. Increasing the section size, from 1K to 16K characters, decreases the operating frequency by 20%. This is due to larger adder sizes and larger module circuits. The percentage of slices used for these decreases from 25% to 2.5%. This is because more logic is required for processing multiple FM-indices compared to a single unit for one long text section length. Looking at both graphs, it appears better to implement the FM-index on an FPGA using longer text lengths.

Maximizing the throughput of the design may be a consideration in some implementations. In the FM-index algorithm, as in BWT, the search for the pattern is applied to the whole text. In general, the larger the text that can be fitted on the FPGA the higher the effective throughput, for example as measured in number of character comparisons per second. Maximizing the clock frequency by pipelining implementations is also performed in some embodiments.

TABLE 3

Resource utilization and Frequency of FM-index

| Modules | | BRAM-18 Utilization | Slices | Freq | Throughput |
|---------|---|---------------------|--------|------|------------|
| Size | No. of | (%) | (%) | (MHz) | ($10^{12}$ cc/s) |
| FM-1K | 352 | 1,430 (99.0%) | 35 | 251 | 84.31 |
| FM-2K | 168 | 1,366 (94.8%) | 19 | 244 | 81.10 |
| FM-4K | 126 | 1,422 (98.7%) | 13 | 241 | 112.40 |
| FM-8K | 58  | 1,422 (98.7%) | 8  | 213 | 100.13 |
| FM-16K | 27 | 1,432 (99.4%) | 4  | 201 | 88.55 |

Table 3 shows the resource utilization, operating frequencies and throughput of five FM-index implementations with a pattern length of 36 on the Virtex 6 LX760. which has a total of 1,440 BRAM-18. A mix of BRAM-18 and BRAM-36 were actually used, but the total number in terms of BRAM-18.

TABLE 4

Overhead due to text overlap for search string length 36

| Module Size | Total Characters | Overlap Characters | Overlap Overhead |
|-------------|------------------|--------------------|-----------------| 
| FM-1K  | 360448 | 24570 | 6.8%  |
| FM-2K  | 344064 | 11690 | 3.4%  |
| FM-4K  | 475136 | 8750  | 1.8%  |
| FM-8K  | 475136 | 3990  | 0.84% |
| FM-16K | 442368 | 1820  | 0.41% |

Having the text partitioned across multiple modules generally requires that segments of the text be replicated in contiguous modules. This introduces some area overhead as shown in Table 4 for a search string length of 36. More overlaps occur for longer pattern lengths because longer end sections of the text are repeated. These overlaps are deducted from the total text characters placed on the FPGA, which reduces the effective length of the text. As can be seen in Table 3, the FM-4K achieves the highest throughput.

A limitation of the implementations discussed above is the size of memory available on the FPGA. Depending on FPGA memory constraints, texts with large lengths may need to be divided into sections and processed in batches. This limits the inherent speed up of the algorithm because the search is effectively performed on sections sequentially instead of performing the entire search on the text. Some implementations ameliorates this limitation by using external memory in storing the C-table.

Figure 5:
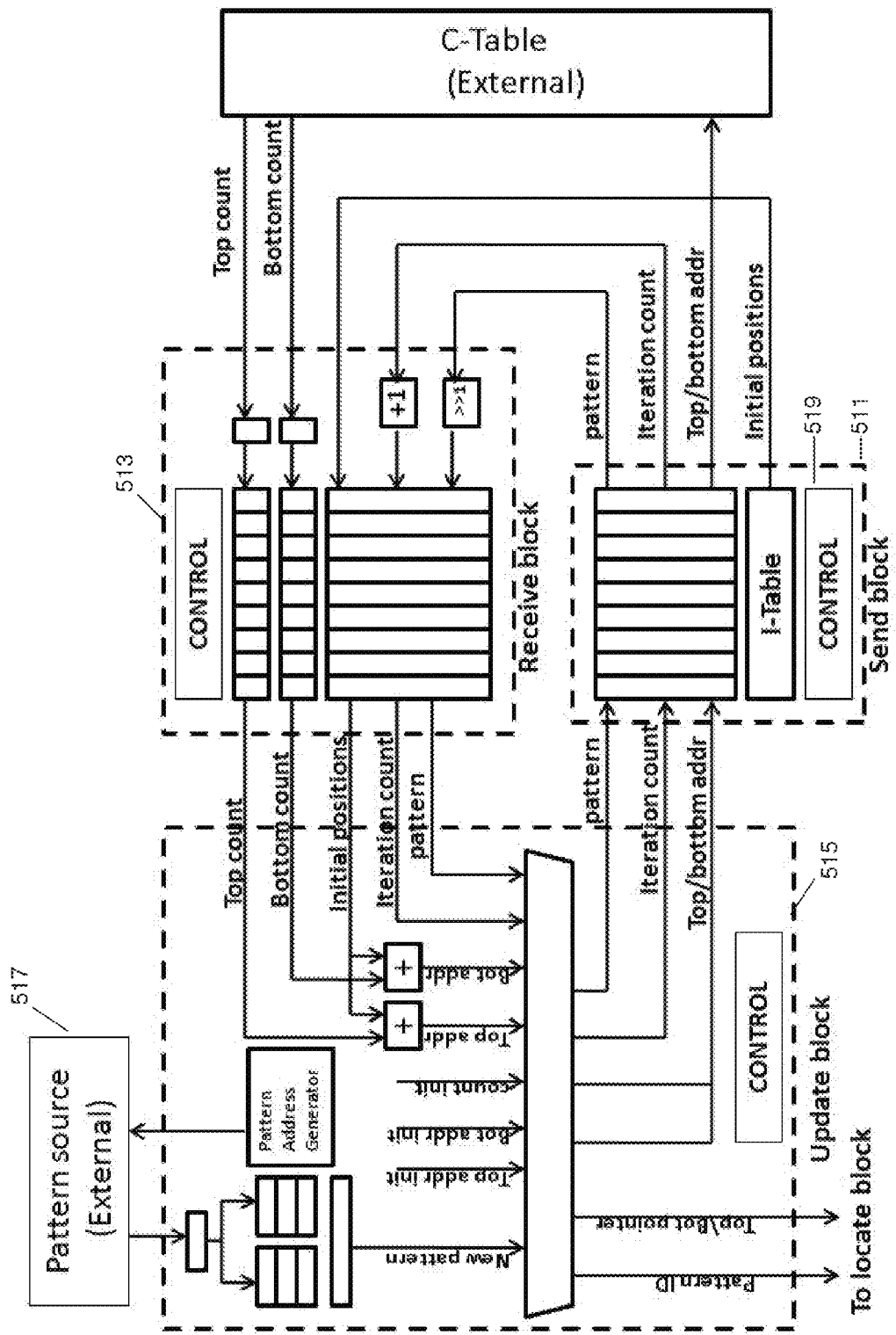
FIG. 5 is a block diagram of a further hardware implementation of exact string matching using external memory in accordance with aspects of the invention.

FIG. 5 shows a block diagram implementing exact matching using external memory. The implementation includes three main blocks: send 511, receive 513, and update 515 blocks. The C-table and list of patterns are placed on external memory. The I-table is placed on LUTs of the FPGA.

The update block reads external memory 517 for search patterns and generates pattern ids for each pattern. The update block also generates a reverse complement of the pattern, for example in terms of DNA sequences, for example so that the implementation has the same number of search patterns compared to Bowtie. The update block arranges pattern data from external memory to contain pattern information: the pattern, pattern id, iteration count, top and bottom pointers.

The send block receives and inserts the formatted pattern information in a send queue. The send block sequentially sends the top and bottom pointers of the first element of the send queue to external memory. An I-table 519 of the send block is accessed using the rightmost to character of the pattern to get the character initial postion. As the top and bottom pointers are sent to external memory, the send block sends the pattern, pattern id, iteration count and character initial position to the receive block. The send block generally continuously sends top and bottom pointers to external memory and pattern information to the receive block until the address queue of the external memory or a receive queue of the receive block is full.

The receive block places pattern information from the send block in the receive queue. The pattern id and character initial position from the send block are retained. The iteration count is incremented by one and the pattern is rotated by one position to the right before it is written to the receive queue. The receive block stores the top and bottom counts to queues as external memory returns the data corresponding to the top and bottom pointers. The first elements of all of the queues are subsequently passed to the update block.

The update block computes new top and bottom pointers of the pattern upon adding the character initial position to the top and bottom counts from the receive block. The update block then chooses whether to pass the pattern from the receive block to the send block or to introduce a new pattern based on the new top and bottom pointers. In some embodiments the following are the conditions when a new pattern is processed: 1) The pattern from the receive block has a top pointer greater than or equal to the bottom pointer, 2) The iteration count is equal to the pattern length and the top pointer is less than the bottom pointer. The first condition indicates that the pattern does not exists in the text while the second condition is the opposite. Both conditions indicate processing of a search pattern should end, and therefore a new search pattern should be introduced. Based on the two conditions, the update block outputs the pattern id, a pattern found signal (or its complement), and the top pointer that corresponds to the last iteration count.

Figure 6:
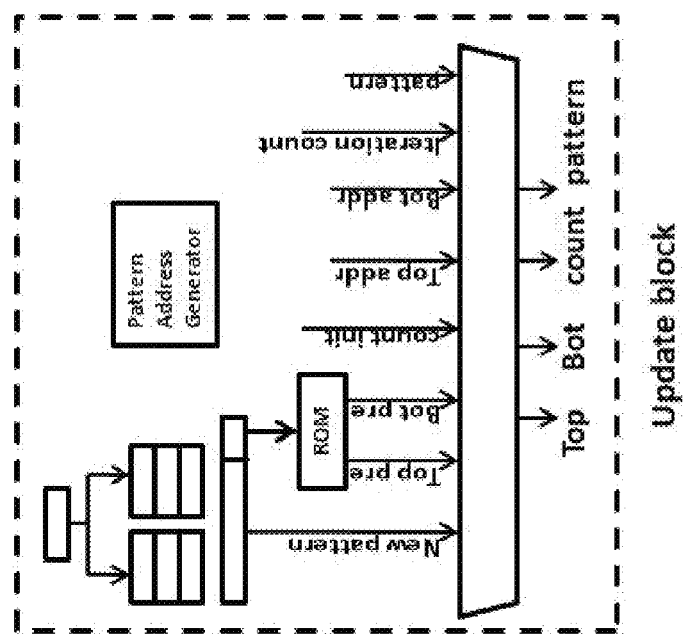
FIG. 6 is a block diagram of a component improvement using pre-calculation in accordance with aspects of the invention.

The performance of the system previously discussed highly depends on the number of external memory requests. The higher number of requests, the slower is the execution. To reduce this number, the top and bottom pointers are precalculated for all character combinations up to a length such that all top pointers are less than their corresponding bottom pointers for every C-table. Instead of initializing the top and bottom pointers to the first and last rows of the C-table, the pointers may be initialized to the precalculated values. The precalculated values are stored in a read-only memory (ROM) and the last 1 characters are used to access the precalculated values. FIG. 6 shows an update block including precalculation.

Figure 7:
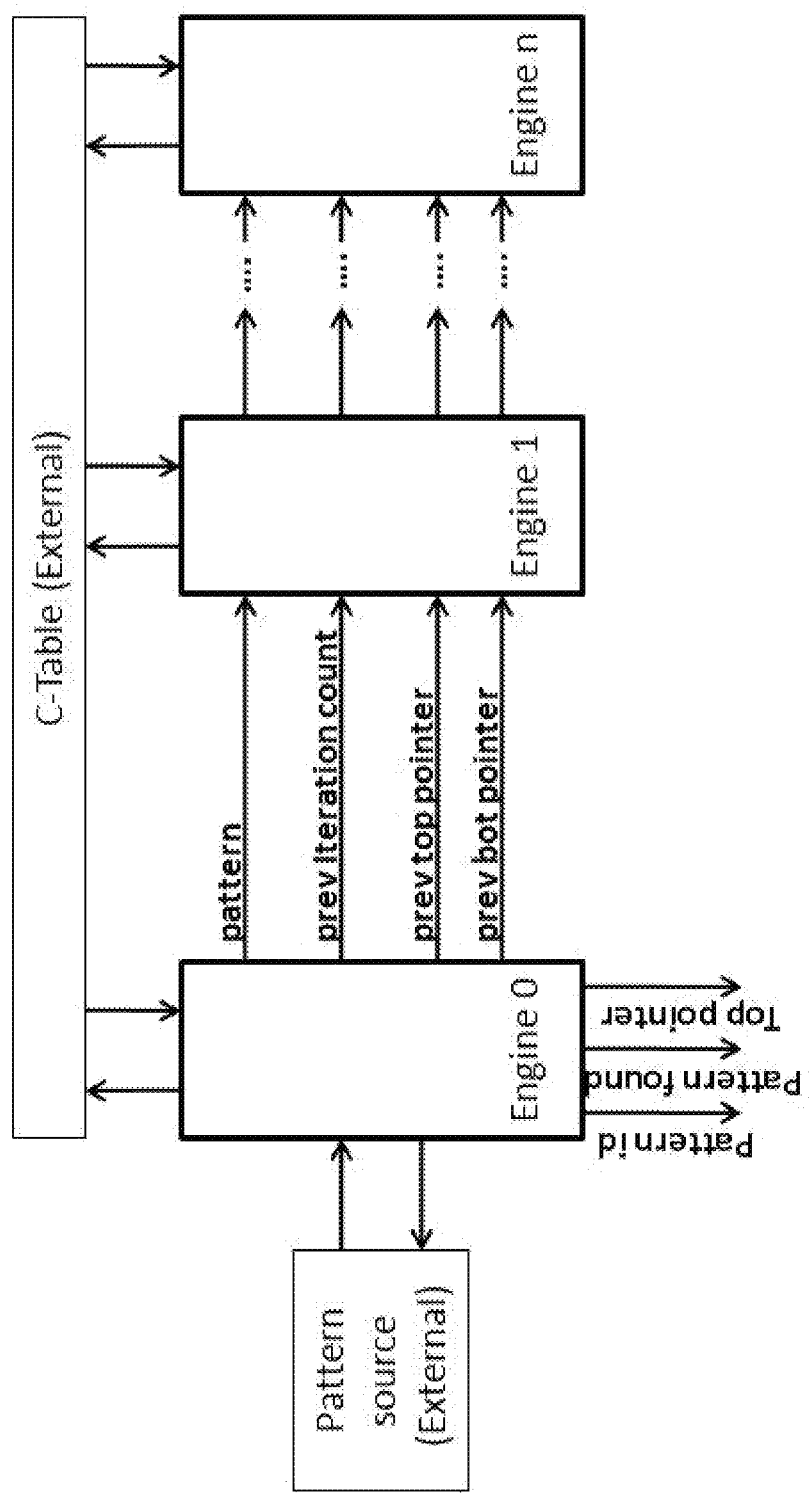
FIG. 7 is a block diagram of a further hardware implementation extending exact matching to approximate matching in accordance with aspects of the invention.

For minimal change to the structure of the exact matching architecture, some embodiments use multiple exact matching engines to expand the capability to approximate matching. For every n allowed mismatches, n+1 exact matching engines are used. FIG. 7 is a block diagram that shows connections between exact matching engines. Engine 0 handles exact string matching and reads patterns from external memory. When a pattern p on iteration k fails on Engine 0, information of pattern p is passed to Engine 1. More generally, the following are passed to a next engine n: 1) the pattern ID, 2) the pattern rotated by one position to the left. 3) the iteration count decremented by one, 4) and the top and bottom pointers on iteration k−1. The data passed are inputted to a replace block that follows a heuristic that enables mismatches. The heuristic and the replace block are discussed in the next section.

Figure 8:
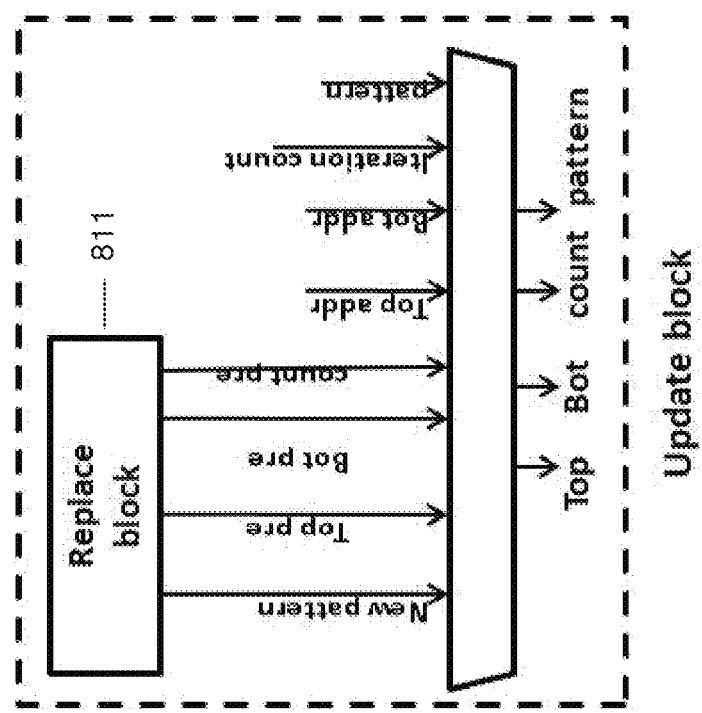
FIG. 8 is a block diagram of a further hardware implementation enabling approximate matching in accordance with aspects of the invention.

The replace block executes a heuristic that allows approximate matching. The heuristic creates three copies of the failing pattern with each copy having the same accepted pattern id. The failing character of each copy is replaced by the other three characters. A flag f is set for a pattern copy as each is inserted to the queue of the update block of Engine 1. The flag f indicates that a pattern copy is recently inserted to Engine 1. If a pattern copy fails on its first iteration on Engine 1, the copy finishes processing and is no longer passed to a next engine. If the copy proceeds to the next iteration on Engine 1, then the flag f of the copy is reset. If the copy fails on any succeeding iterations, the copy is passed to a next engine where new copies are created again. FIG. 8 shows a block diagram of the update block with a replace block 811 inserted on the update block of Engine 1. Engine 1 accepts patterns from the replace block instead of external memory.

Figure 9:
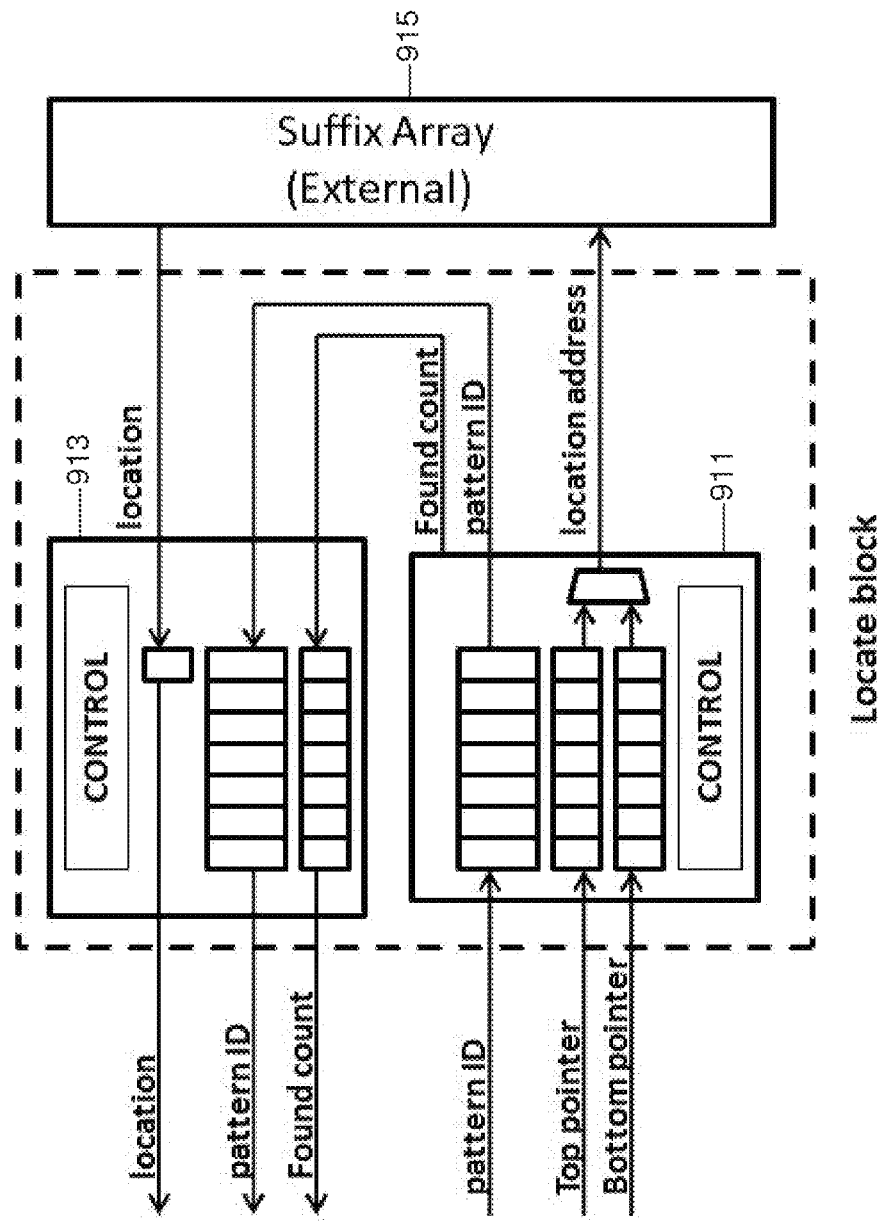
FIG. 9 is a block diagram of a further hardware implementation that determines location of patterns in accordance with aspects of the invention.

Patterns that exists from the matching engines are passed to a locate block that searches the location of the pattern on the text. The data passed to the locate block for each pattern are the pattern ID and the top and bottom pointers. The architecture of the locate block is similar to send and receive blocks. FIG. 9 shows a block diagram of the locate block. It includes send queues 911 for sending addresses to external memory 915 and receive queues 913 for waiting data returning from memory. The locate block sends the top pointer as an address to the suffix array placed in external memory. External memory returns the data to the locate block which is written to the output file. If a pattern exists at multiple locations, the top pointer is incremented by one and the resulting address sent to external memory. The resulting address is incremented again and the new address is sent to memory until the address is equal to the bottom pointer.

The application discusses pattern matching. Although the invention has been discussed with respect to various embodiments, it should be recognized that the invention may be practiced other than as specifically described. Accordingly, it should be recognized that the invention comprises the novel and non-obvious claims supported by this disclosure, and their insubstantial variations.

The invention claimed is:

1. A method using circuitry for processing a substring with respect to a text string, comprising:

storing in memory information for characters in a sorted BWT of a text string indicating a position of a first occurrence of each of those characters in the sorted Burrows-Wheeler transform (BWT) of the text string;

storing in memory, for characters of an allowable alphabet, an ordered set of values indicating the number of occurrences of that character in preceding characters of a BWT of the text string, with the order of the values in the order of the characters of the BWT of the text string;

initializing a signal indicating a first index to indicate a first position of the ordered set of values and initializing a signal indicating a second index to indicate a second position of the ordered set of values, the second position being different than the first position;

iteratively receiving a signal indicative of a new character of a specified substring, setting, by the circuitry, the signal indicating the first index to indicate a first new position, the first new position being based on a sum of a) the value of the ordered set of values currently indicated by the position of the first index for the new character and b) the information indicating the first occurrence of the new character in the sorted BWT of the text string, and setting, by the circuitry, the signal indicating the second index to indicate a second new position, the second new position being based on a sum of c) the value of the ordered set of values currently indicated by the position of the second index for the new character and d) the information indicating the first occurrence of the new character in the sorted BWT of the text string; and providing, by the circuitry, a signal indicating that the specified substring does not appear in the text string if, for any characters of the specified substring, the position of the first index relative to the position of the second index within the ordered set of values is reversed compared to the initial position of the first index relative to the initial position of the second index within the ordered sets of value or if the position of the first index and the position of the second index within the ordered sets of values is the same position.

2. The method of claim 1 wherein the circuitry comprises a field programmable gate array (FPGA).

3. The method of claim 2 wherein the memory storing, for characters of an allowable alphabet, an ordered set of values indicating the number of occurrences of that character in preceding characters of a BWT of the text string is block RAM (BRAM) of the FPGA.

4. The method of claim 2 wherein the memory storing, for characters of the allowable alphabet, the ordered set of values indicating the number of occurrences of that character in preceding characters of the BWT of the text string is memory external to the FPGA.

5. The method of claim 2, wherein the signal indicative of the new character is received from a shift register.

6. The method of claim 1, wherein the allowable alphabet is an alphabet of a genome, and the text string is at least part of a particular genome.

7. The method of claim 1, wherein the initial position of the first index is a top position of the ordered set of values, the initial position of the second index is a bottom position of the ordered set of values, and the position of the first index relative to the position of the second index is reversed if the position of the second index is closer to the top position of the ordered set of values than the position of the first index.

8. The method of claim 1, further comprising storing in memory at least samples of suffix arrays for the text string, and determining a location of the specified substring in the text string using the at least samples of suffix arrays.

9. Circuitry for processing a substring with respect to a text string, comprising:

a shift register configured to receive a information of a substring and sequentially provide as an output information of characters of the substring;

a memory block configured to store information of an I-table for a text string;

a plurality of memory blocks configured to store information of a C-table for an allowable alphabet for the text string;

a top multiplexer configured to select, using the output of the shift register, as an output one of first memory locations from each of the plurality of memory blocks storing information of the C-table;

a bottom multiplexer configured to select, using the output of the shift register, as an output one of second memory locations from each of the plurality of memory blocks storing information of the C-table;

a top summer configured to sum the output of the top multiplexer and a selected, using the output of the shift register, a memory location of the memory block storing information of the I-table, an output of the top summer indicating the first memory locations of the plurality of memory blocks storing information of the C-table; and a bottom summer configured to sum the output of the bottom multiplexer and the selected memory location of the memory block storing information of the I-table, an output of the bottom summer indicating the second memory locations of the plurality of memory blocks storing information of the C-table.

10. The circuitry of claim 9, wherein the shift register, the top multiplexer, the bottom multiplexer, the top summer, and the bottom summer are implemented as part of a field programmable gate array (FPGA).

11. The circuitry of claim 10, wherein the plurality of memory blocks configured to store information of the C-table is implemented as memory of the FPGA.

12. The circuitry of claim 10 wherein the plurality of memory blocks configured to store information of the C-table is implemented as memory external to the FPGA.

13. Circuitry for processing a substring with respect to a text string, comprising:

memory for storing information for characters in a sorted BWT of a text string indicating a position of a first occurrence of each of those characters in the sorted Burrows-Wheeler transform (BWT) of the text string;

memory for storing characters of an allowable alphabet, an ordered set of values indicating the number of occurrences of that character in preceding characters of a BWT of the text string, with the order of the values in the order of the characters of the BWT of the text string;

means for initializing a first index to indicate a first position of the ordered set of values and means for initializing a second index to indicate a second position of the ordered set of values, the second position being different than the first position;

means for iteratively receiving a signal indicative of a new character of a specified substring;

means for setting the first index to indicate a first new position, the first new position being based on a sum of the value of the ordered set of values currently indicated by the position of the first index for the new character and the information indicating the first occurrence of the new character in the sorted BWT of the text string; and means for setting the second index to indicate a second new position, the second new position being based on a sum of the value of the ordered set of values currently indicated by the position of the second index for the new character and the information indicating the first occurrence of the new character in the sorted BWT of the text string.

14. The circuitry of claim 13 wherein the means for setting the first index to indicate the first new position and the means for setting the second index to indicate a second new position are implemented in a field programmable gate array (FPGA).

15. The circuitry of claim 13 wherein the means for setting the first index to indicate the first new position and the means for setting the second index to indicate a second new position together comprise a processing engine.

16. The circuitry of claim 15 further comprising a plurality of processing engines, a first of the plurality of processing engines configured to receive at least information of the specified substring, the first index, and the second index, and the first of the plurality of processing engines and at least some of the other plurality of processing engines is configured to provide at least information of the specified substring, a further first index, and a further second index.

17. The circuitry of claim 16, wherein the information of the specified substring for which at least some of the plurality of processing engines is configured to provide is rotated information of the specified substring.

\* \* \* \* \*